United States Patent
MacInnis et al.

(10) Patent No.: US 8,831,091 B2
(45) Date of Patent: Sep. 9, 2014

(54) ADAPTIVE WIRELESS CHANNEL ALLOCATION FOR MEDIA DISTRIBUTION IN A MULTI-USER ENVIRONMENT

(75) Inventors: Alexander G. MacInnis, Los Altos, CA (US); Peyush Agarwal, Milpitas, CA (US); Yasantha N. Rajakarunanayake, San Ramon, CA (US)

(73) Assignee: Broadcom Corporation, Irvine, CA (US)

( * ) Notice: Subject to any disclaimer, the term of this patent is extended or adjusted under 35 U.S.C. 154(b) by 256 days.

(21) Appl. No.: 13/231,481

(22) Filed: Sep. 13, 2011

(65) Prior Publication Data

US 2012/0307747 A1    Dec. 6, 2012

Related U.S. Application Data

(60) Provisional application No. 61/491,838, filed on May 31, 2011.

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04W 72/12* | (2009.01) |
| *H04W 72/04* | (2009.01) |

(52) U.S. Cl.
CPC ...... *H04W 72/1252* (2013.01); *H04W 72/0486* (2013.01); *Y02B 60/50* (2013.01)
USPC .................................. 375/240.01; 375/240.08

(58) Field of Classification Search
USPC ................................................ 375/240–241
See application file for complete search history.

(56) References Cited

U.S. PATENT DOCUMENTS

| | | | | |
|---|---|---|---|---|
| 7,889,756 | B2 * | 2/2011 | Pernu ............................ | 370/444 |
| 8,073,951 | B1 * | 12/2011 | Young ........................... | 709/226 |
| 2003/0018803 | A1 * | 1/2003 | El Batt et al. ................. | 709/236 |
| 2006/0239272 | A1 * | 10/2006 | Heidari-Bateni et al. ....................... | 370/395.21 |
| 2008/0152003 | A1 * | 6/2008 | Oguz ....................... | 375/240.12 |
| 2009/0245415 | A1 * | 10/2009 | Hosein ......................... | 375/295 |
| 2009/0247204 | A1 * | 10/2009 | Sennett et al. ................ | 455/512 |
| 2012/0307747 | A1 * | 12/2012 | MacInnis et al. ............. | 370/329 |
| 2013/0003583 | A1 * | 1/2013 | Landstrom et al. ........... | 370/252 |

\* cited by examiner

*Primary Examiner* — Benjamin H Elliott, IV
(74) *Attorney, Agent, or Firm* — Garlick & Markison; Bruce E. Garlick

(57) ABSTRACT

Adaptive wireless channel allocation in a multi-user environment based on quality of received video streams. During the transmission of encoded media streams from a wireless access device to at least first and second video devices over a wireless channel, transmission windows are allocated in shared transmission frame intervals for transmission of media packets to the first and second video devices, respectively. Relative priorities are set/adjusted for the video devices based, at least in part, on one or more of the following: channel estimation information, reception characteristics, transmission acknowledgment information, video device characteristics and/or user feedback. The relative priorities are utilized to adaptively (re)allocate at least one portion of the transmission frame intervals. In addition to channel reallocation, the prioritization of devices may be utilized to adaptively alter the encoding bit rate of one or more media streams.

19 Claims, 9 Drawing Sheets

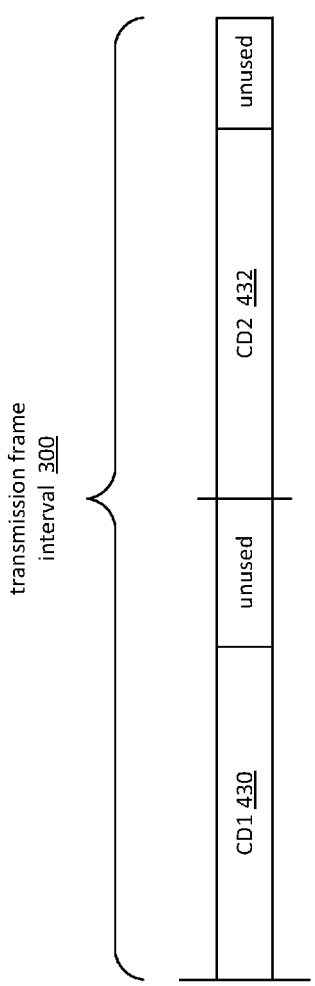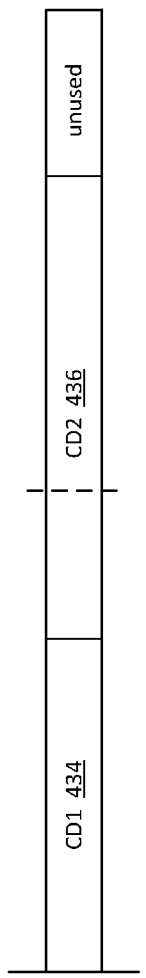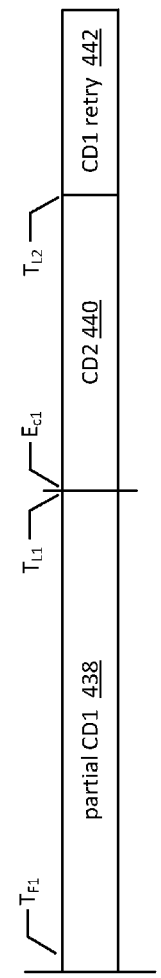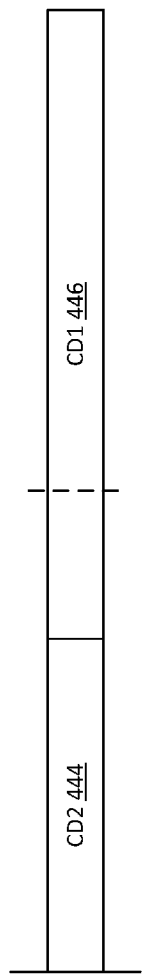

ADAPTIVE WIRELESS CHANNEL ALLOCATION FOR MEDIA DISTRIBUTION IN A MULTI-USER ENVIRONMENT

CROSS REFERENCE TO RELATED PATENTS/PATENT APPLICATIONS

Provisional Priority Claim

The present U.S. Utility Patent Application claims priority pursuant to 35 U.S.C. §119(e) to U.S. Provisional Application No. 61/491,838, entitled "Media communications and signaling within wireless communication systems," filed May 31, 2011, which is hereby incorporated herein by reference in its entirety and made part of the present U.S. Utility Patent Application for all purposes.

Incorporation by Reference

The following U.S. Utility Patent Applications are hereby incorporated herein by reference in their entirety and made part of the present U.S. Utility Patent Application for all purposes:

1. U.S. Utility patent application Ser. No. 13/223,250, entitled "Dynamic Wireless Channel Selection and Protocol Control for Streaming Media," filed on Aug. 31, 2011, which claims priority pursuant to 35 U.S.C. §119(e) to U.S. Provisional Application No. 61/491,838, entitled "Media communications and signaling within wireless communication systems," filed May 31, 2011.

2. U.S. Utility patent application Ser. No. 13/231,402, entitled "Fair Channel Allocation for Multiple Clients," filed on the same date herewith, which claims priority pursuant to 35 U.S.C. §119(e) to U.S. Provisional Application No. 61/491,838, entitled "Media communications and signaling within wireless communication systems," filed May 31, 2011.

Incorporation by Reference

The following standards/draft standards are hereby incorporated herein by reference in their entirety and are made part of the present U.S. Utility Patent Application for all purposes:

1. "WD3: Working Draft 3 of High-Efficiency Video Coding, Joint Collaborative Team on Video Coding (JCT-VC)," of ITU-T SG16 WP3 and ISO/IEC JTC1/SC29/WG11, Thomas Wiegand, et al., 5$^{th}$ Meeting: Geneva, CH, 16-23 Mar., 2011, Document: JCTVC-E603, 215 pages.

2. International Telecommunication Union, ITU-T, TELECOMMUNICATION STANDARDIZATION SECTOR OF ITU, H.264 (03/2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent.

Incorporation by Reference

The following IEEE standards/draft IEEE standards are hereby incorporated herein by reference in their entirety and are made part of the present U.S. Utility Patent Application for all purposes:

1. IEEE Std 802.11™—2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™-2007, (Revision of IEEE Std 802.11-1999), 1233 pages.

2. IEEE Std 802.11n™—2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™-2009, (Amendment to IEEE Std 802.11™—2007 as amended by IEEE Std 802.11k™—2008, IEEE Std 802.11r™—2008, IEEE Std 802.11y™—2008, and IEEE Std 802.11r™—2009), 536 pages.

3. IEEE P802.11ac™/D1.1, August 2011, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz," Prepared by the 802.11 Working Group of the 802 Committee, 297 total pages (pp. i-xxiii, 1-274).

BACKGROUND OF THE INVENTION

1. Technical Field of the Invention

The invention relates generally to wireless communication systems; and, more particularly, it relates to adaptive channel allocation for video stream transmissions.

2. Description of Related Art

Many approaches for improving video error robustness/concealment have been proposed, and these approaches can generally be divided into two groups. The first group is related to network layer solutions that attempt to recover the error/packet loss at packet layer, by providing an error free A/V stream to the video decoder. Such solutions usually require redundant codes and retransmissions. The second group is related to video layer solutions, especially post-processing, that will accept a corrupted video stream and try to mitigate gaps and mismatches in the decoded video frames.

As may be understood, both of these groups (network layer solutions and video layer solutions) have their strengths and weaknesses. In particular, a heavily protected network layer might be very robust and resilient to errors, but usually this is accompanied by a reduction in the constant throughput of the channel and/or an increase in the effective latency of the channel. For the video layer, one of the primary considerations is the overall user experience (e.g., the perceptual experience of a user). Video should appear smooth and natural, even under variable network conditions. Under variable channel conditions, providing an acceptable user experience can be particularly challenging for real-time (or near realtime) video streams, as both packet loss and channel delay can have deleterious effects on perceived video quality (e.g., blocking or blurring effects, video freezing or jerkiness, and audio/video synchronization issues).

More particularly, during real-time video encoding and transmission, a packet transmission incremental delay that causes the packet to arrive at the receiver after the time it is needed for decoding might have the same effect as an expired or lost packet. The video decoder typically needs to decode and present each video frame within a relatively short time period. Consequently, if a packet is delayed too much over the network it might be impossible to complete frame decoding in time for display. If a delayed or dropped frame is also a reference frame for other frames, decoding errors for multiple frames may occur. Particularly in the context of wireless communications under noisy channel conditions, the present art does not provide an adequate means by which communication of video/media related content may be effectuated in a robust, reliable, and perceptually acceptable manner.

BRIEF DESCRIPTION OF THE SEVERAL VIEWS OF THE DRAWINGS

FIGS. 4A-4D illustrate example allocations of the transmission frame interval of FIG. 3 according to various wireless channel conditions.

DETAILED DESCRIPTION OF THE INVENTION

Figure 1:
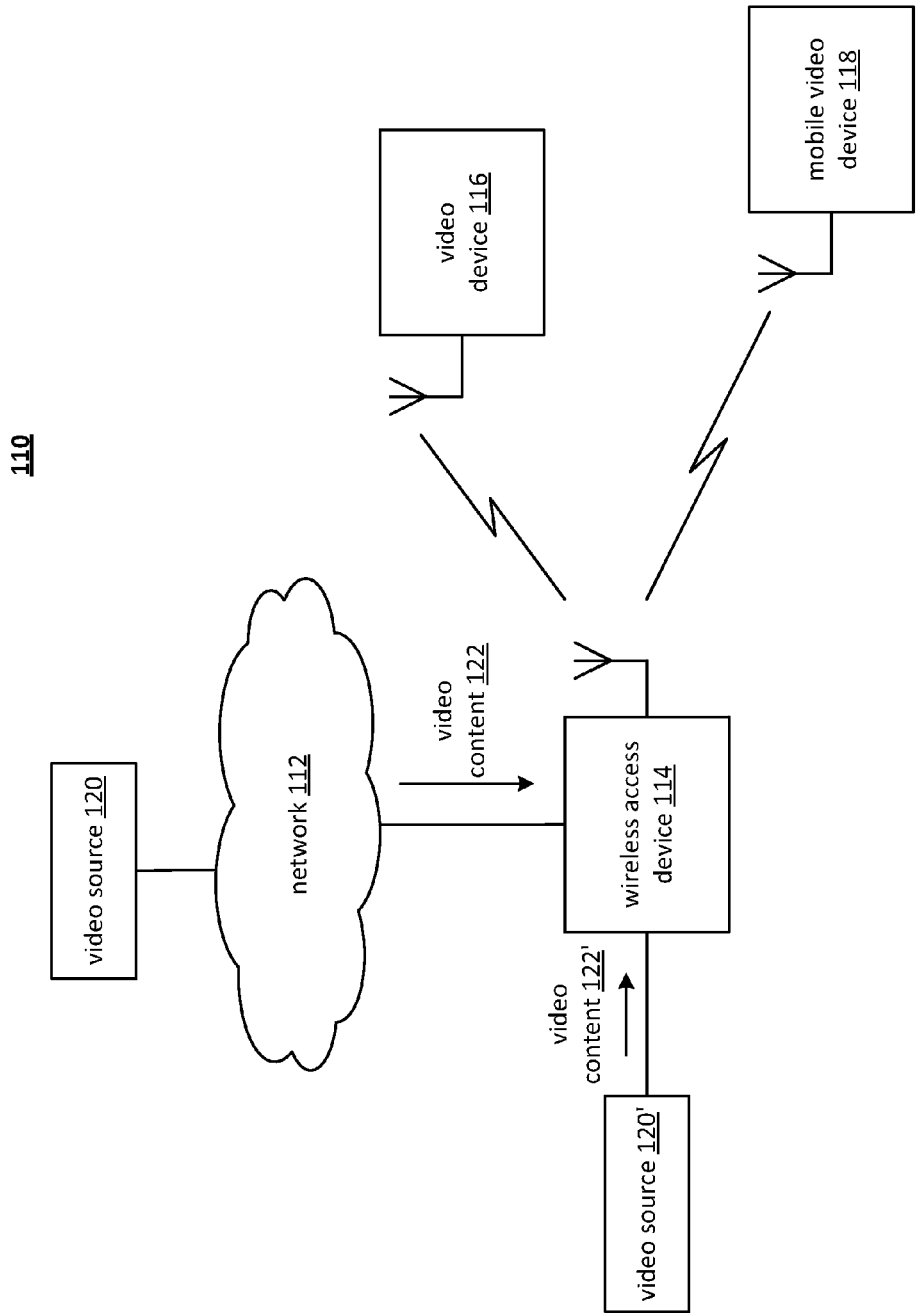
FIG. 1 is a block diagram representation of a video network in accordance with an embodiment of the present invention.

A number of protocols have been developed for applications involving the transmission of streaming video, real-time audio/video, home gaming audio/video, et cetera over multicast or unicast networks. These protocols are generally effective when the transmission medium is not heavily loaded and transmission delays are infrequent. However, many of these protocols (such as the Real-time Transport Protocol (RTP)/Real Time Streaming Protocol (RTSP)) or variants do not always guarantee Quality of Service (QoS) for real-time services. Likewise, other standards-based QoS approaches (e.g., Wi-Fi Multimedia (WMM)) may not provide for guaranteed channel throughput.

Certain techniques, such as packet aggregation, may improve efficiency by allowing transmission bursts of multiple data packets. However, the probability of packet corruption (e.g., due to collision or channel noise) increases with packet size. In particular, use of large frame aggregation sizes may not provide optimal multi-user experience in high bit error rate (BER) channels. Multimedia traffic, for example, may have associated QoS requirements (e.g., maximum tolerable delay and/or frame error rates) that are negatively impacted by less than optimal frame sizes. In gaming environments and other delay-sensitive applications such as streaming multimedia or Voice over Wireless LAN, including for example relatively constant bit applications such as IPTV, low latency is desirable in order to reduce the occurrence of lags that might arise from channel deterioration.

In addition, certain implementations of a medium access control (MAC) scheduler (e.g., a 802.11e/WMM MAC scheduler) may, by default, attempt transmission of AMPDUs destined for a given client device in the order of arrival from the encoder, and invoke retransmission procedures for failed packets (up to a maximum retry limit) at lower PHY rates for improved error resiliency under changing channel conditions. Multiple retransmissions at "fall back" PHY rates, however, may typically entail greater channel coding rates (redundant data). Further, if at least one receiving device operating a shared transmission medium has a low SNR or other channel quality limitations (such as a low MIMO rank) and requires a relatively high percentage of channel capacity, other client devices may suffer performance degradation. As will be appreciated, use of adaptive channel allocation according to the present invention may reduce the occurrence of such performance degradation.

Novel approaches are presented herein for optimizing video transmission over a packet-based, lossy communication medium/channel in order to improve the end user experience. The novel approaches relate to adaptive channel allocation based on unused allocations and/or quality of received video streams in order to improve error concealment, error resilience and bandwidth usage during, for example, transmission of a video stream(s) having a relatively constant bit rate. The novel approaches are generally related to video digital video compression, and generally applicable to video compression standards, protocols, and/or recommended practices (e.g., MPEG-4 Part 2, H.264 (AVC), VC-1, WMV, AVS, RealVideo and Quicktime, among others). While the novel approaches presented herein often employ wireless packet-based transmissions as exemplary embodiments (e.g., UDP/IP), the various aspects and principles, and their equivalents, can also be extended generally to any packet-based network transmission (regardless of the particular type of communication medium being employed such as wired, wireless, optical, et cetera), including over lossy or variable communication channels.

Referring more specifically to the figures, FIG. 1 is a block diagram representation of a video network 110 in accordance with an embodiment of the present invention. The network 112 distributes information such as video content 122 from a video source 120 (or video content 122' from directly coupled video source 120') to a wireless access device 114 for wireless transmission to wireless video devices, such as video device 116 and mobile video device 118, over one or more wireless channels. The video content 122 can include movies, television shows, commercials or other advertisements, educational content, video gaming content, infomercials, animation, menu/interactive content and/or other program content and optionally additional data associated with such program content including but not limited to digital rights management data, control data, programming information, additional graphics data and other data that can be transferred in association with program content. Video content 122 can include video with or without associated audio content. The video content 122 can be sent as broadcast video, streaming video, video on demand and near video on demand programming and/or other formats.

The network 112 can be a dedicated video distribution network such as a direct broadcast satellite network or cable television network that distributes video content 122 from a plurality of video sources, including video source 120, to a plurality of wireless access devices and, optionally, wired devices over a wide geographic area. Alternatively, network 112 can be a heterogeneous network that includes one or more segments of a general purpose network such as the Internet, a metropolitan area network, wide area network, local area network or other network and optionally other networks such as an Internet protocol (IP) television network. Over various portions of a given network, the video content 122 can be carried as analog and/or digital signals according to various recognized protocols.

Wireless access device 114 may comprise a base station or access point that provides video content 122 to one or a plurality of video subscribers over a wireless local area network (WLAN) such as an 802.11 a/b/g/n/ac, WIMAX or other WLAN network, or a cellular network such as a UMTS, EDGE, 3G, 4G or other cellular data network. In addition, the wireless access device 114 can comprise a home gateway, video distribution point in a dedicated video distribution network or other wireless gateway for wirelessly transmitting video content 122, either alone or in association with other data, signals or services, to video device 116 and/or mobile video device 118.

Mobile video device 118 may comprise a video enabled wireless smartphone, remote gaming interface, portable media player, laptop or tablet computer, "digital" book, or other handheld communication device that is capable of displaying video content. Video device 116 may comprise other video display devices that may or may not be mobile, including a television coupled to a wireless receiver, a computer with wireless connectivity via a wireless data card, wireless tuner, wireless speakers (e.g., surround sound speakers for receiving high quality audio that may have strict latency requirements), WLAN modem or other wireless link or device that alone or in combination with other devices is capable of receiving video content 122 from wireless access device 114 and displaying and/or storing the video content 122 for a user.

The network 112, wireless access device 114, video device 116 and/or mobile video device 118 include one or more features of the present invention that will be described in greater detail in conjunction with FIGS. 2-8 that follow.

Figure 2:
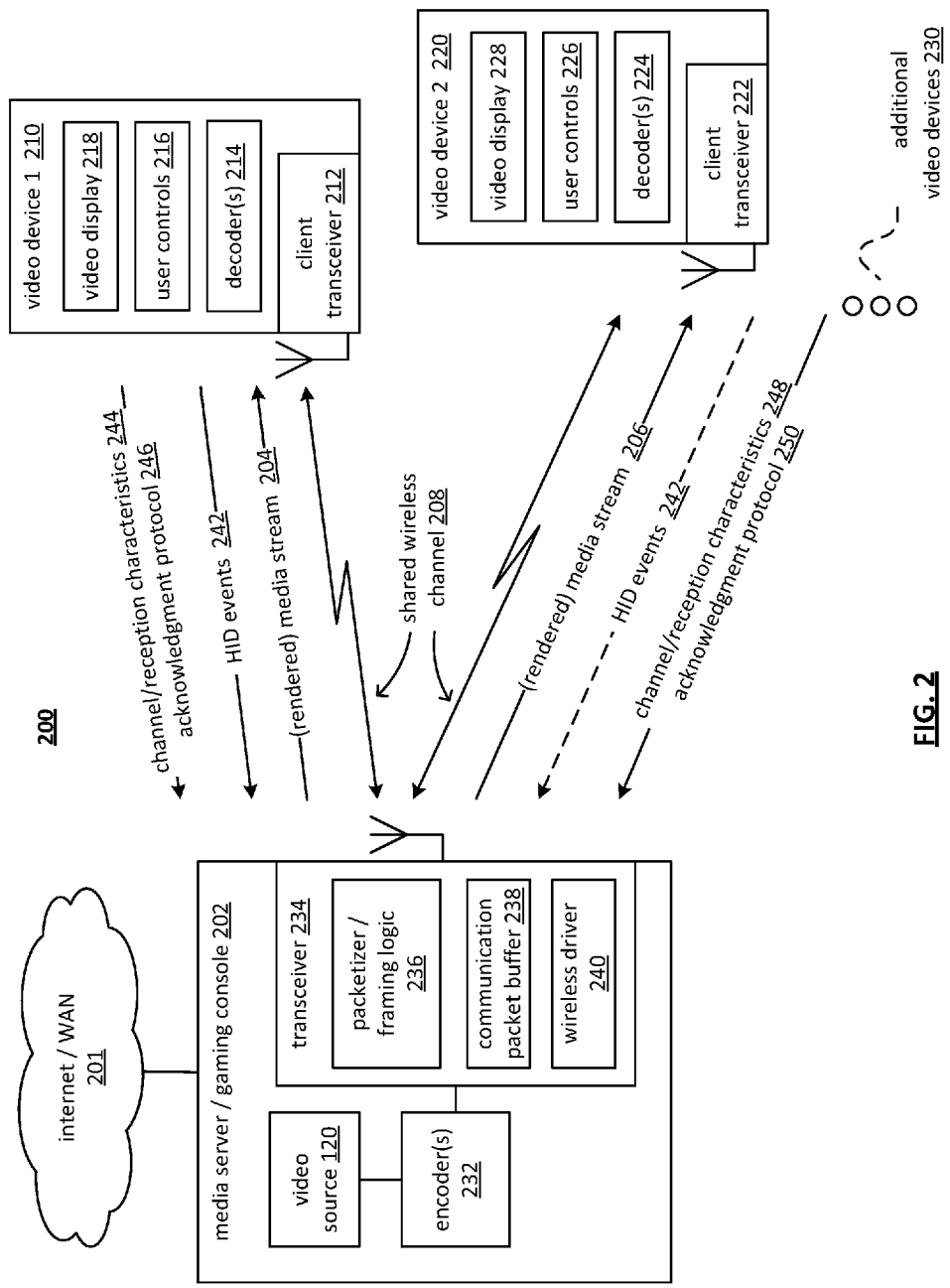
FIG. 2 is a functional block diagram of a communication system in which media streams are communicated to a plurality of client devices over a shared wireless channel in accordance with one embodiment of the present invention.

FIG. 2 is a functional block diagram of a communication system 200 in which media streams are communicated to a plurality of client devices over a shared wireless channel in accordance with one embodiment of the present invention. Packetizer/framing logic 236 is shown that can be used as part of wireless access device in the form of a media server/gaming console 202 to provide (rendered) media streams 204 and 206 to video device 1 210 and video device 2 220, respectively, over a wireless channel 208. Generally speaking, when considering a communication system in which video data is communicated wirelessly from one location, or subsystem, to another, video data encoding may generally be viewed as being performed at a transmitting side of the wireless channel 208, and video data decoding may generally be viewed as being performed at a receiving side of the wireless channel 208.

In the illustrated embodiment, video content is provided by a video source 120 to the media server/gaming console 202 for (further) encoding and transmission. The video source 120 may comprise, for example, a graphics processing unit in a gaming console or like device that produces a rendered video steam. Alternatively, the video content may be communicated to the media server/gaming console 202 by various means such as those described above, including through a broadband internet/wide area network (WAN) connection 201. In one embodiment, the media server/gaming console 202 may be coupled to a cable or satellite set top box or the like by a standardized interconnect/interface such as an HDMI cable, an Ethernet cable, a high bandwidth wireless link (e.g., a WiGig or WirelessHD compliant link) capable of transmitting standard or high definition video content, or various combinations of such technologies. Further, the communication system 200 may comprise one or more additional video devices 230 or groupings/ad hoc groupings of such devices.

Media server/gaming console 202 includes a video encoder(s) 232 that receives and encodes video content from a video source 120 for transmission (in the form of media stream 204/206) by transceiver 234 over wireless channel 208. As described more fully below with reference to FIGS. 3-8, the illustrated transceiver 234 includes packetizer/framing logic 236 operable, in conjunction with other medium access control (MAC) functionality, to adaptively allocate (or reallocate) channel capacity in transmission windows. The transceiver 234 further includes a communication packet buffer 238 for buffering encoded media packets for transmission, or retransmission under certain circumstances. The packetizer/framing logic 236 may communicate directly with a wireless driver 240 and other physical layer (PHY) functionality to coordinate transmissions in accordance with the present invention. Among other functions, such PHY functionality establishes and terminates connections to the wireless channel 208 and generates and transmits modulated RF signals containing encoded media packets.

In the illustrated embodiment, one or more media streams 204/206 are received by client transceivers 212 and 222 of video device 1 210 and video device 2 220 (referred to collectively or in the alternative as video device 1 210 when contextually appropriate). PHY and MAC functionality within client transceivers 212 and 222 then demodulates and down converts RF signals containing the media streams 204/206. In turn, the extracted media streams 204/206 are provided to respective decoders 214 and 224, which operate to generate decoded video streams for display on video displays 218 and 220.

The video devices 210 and 220 of the disclosed embodiment also provide transmission-related information and feedback to the media server/gaming console 206 including, for example, information regarding channel and reception characteristics 244/248 and bit error rate before error correction, signaling in accordance with an acknowledgement (ACK/NACK) protocol 246/250, and human interface device (HID) events 242. Such transmissions may be utilized in determining transmission delay values and wireless channel conditions under a variety of operating conditions and channel selection options. Channel selection and protocol parameter control signals may also be provided from the media server/gaming console 206 to video device 1 210 to indicate new channel and/or protocol parameter selections and to synchronize further wireless communications.

The HID events 242 may be triggered, for example, by input from user controls 216/262, including tactile and/or auditory user input. In addition, the HID events 242 may reflect other sources of control/feedback information, including environmental, proximity and motion sensors. As discussed more fully below in conjunction with FIGS. 7A, 7B and 8, the HID events 242 or similar signaling may be used in adaptive channel allocation in accordance with certain embodiments of the invention.

Hereinafter, the terms "ACK", "acknowledgement", and "BA"/"BACK" are all meant to be inclusive of either ACKs or BACKs (block acknowledgement) and equivalents. For example, even if only one of ACK or BACK is specifically referenced, such embodiments may be equally adapted to any of ACK or BACK and equivalents. One of the benefits of video stream transmission in accordance with the present invention may be a significant reduction in number of negative acknowledgements (NACKs) received by the media server/gaming console 202. It is noted, however, that ACKs may not provide an immediate indication of channel conditions when, for example, an ACK is the result of successful error correction on the receiving side of the wireless channel 208.

Packetizer/framing logic 236 (as well as other functions, such as encoder(s) 232) can be implemented in hardware, software or firmware. In particular embodiments, the packetizer/framing logic 236 can be implemented using one or more microprocessors, microcomputers, central processing units, field programmable logic devices, state machines, logic circuits, analog circuits, digital circuits, and/or any devices that manipulate signals (analog and/or digital) based on operational instructions that are stored in a memory module. The function, steps and processes performed by packetizer/framing logic 236 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the packetizer/framing logic 236 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

Further, within each of the media server/gaming console 202 and video devices 210 and 220, any desired integration or combination may be implemented for the various components, blocks, functional blocks, circuitries, et cetera therein, and other boundaries and groupings may alternatively be performed without departing from the scope and spirit of the invention. For example, all components within the transceiver 234 may be included within a first processing module or integrated circuit, and all components within the client transceivers 212/222 may be included within a second processing module or integrated circuit. Likewise, while shown as separate from video source 102, encoder(s) 232 and packetizer/framing logic 236 could be incorporated into video source 102 or other network element of communication system 200.

Figure 3:
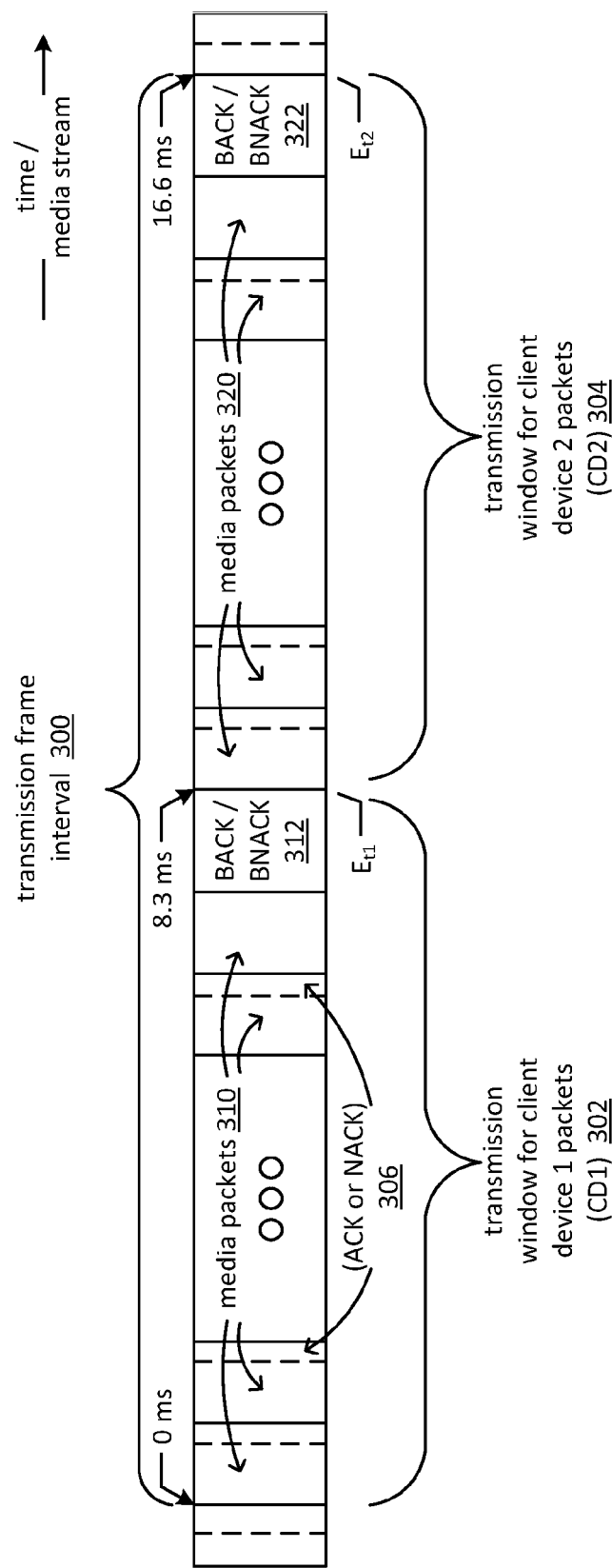
FIG. 3 is an example transmission frame interval according to one embodiment of the invention that supports transmission of media frames to two client devices.

FIG. 3 is an exemplary transmission frame interval 300 for scheduling transmission of at least two media (or video) packets to at least two video devices. In the illustrated embodiment, the transmission frame interval 300 is of generally predetermined duration, and represents the order in which packets are submitted to a PHY layer for transmission to client devices. The transmission frame interval 300 is further subdivided into a plurality of transmission windows 302/304 corresponding to the number of video devices communicating with a media server/gaming console 202 over a shared channel. More particularly, a first transmission window 302 and a second transmission window 304 are allocated for transmission of packets to a first client device (CD1) and a second client device (CD2), respectively.

Depending upon the application, a number of factors may be involved in the selection of the duration of the transmission frame interval 300 and transmission windows 302/304. When communicating video streams to multiple video devices over a shared wireless channel, the display frame rate of the video devices may or may not impose practical limitations on the duration of the transmission frame interval 300. Using high-definition television (HDTV) as an example, a typical frame rate is sixty (60) frames/second (f/s), which may correspond to a transmission frame interval of approximately 16.6 milliseconds (ms). Default transmission window 302/304 allocations for individual video devices may reflect a pro rata share of the transmission frame interval (e.g., 16.6 ms/n, where n is a number of (unicast and/or grouped) video devices receiving a separate video stream over the shared channel). In the illustrated embodiment, where the transmission frame interval is 16.6 ms and n=2, each transmission window has a default duration of 8.3 ms. It is noted that the default duration of a transmission window need not reflect a pro rata share of a transmission frame interval, and in certain embodiments a given video device may be allocated a weighted portion of a transmission window based, for example, on the reception characteristics, location, power state and/or display capabilities of one or more devices receiving transmissions from a wireless access device 114.

Further, the present invention is not limited to a particular video frame frequency or transmission frame interval duration, nor is it limited to any particular relationship between a video frame rate and transmission frame interval. The present invention may also be utilized with more than two video devices, each of which may be allocated one or more transmission windows.

While the present invention is applicable to a variety of standardized and proprietary communications, certain embodiments may make use of QoS features of, for example, the Enhanced Distributed Channel Access (EDCA) mode of the IEEE 802.11e link layer standard. Using EDCA as an example, a contention-free access to a channel may be granted to a particular wireless access device for a period of time referred to as a Transmit Opportunity (TXOP). A TXOP, one or more of which may be employed to establish a transmission frame interval 300, is a bounded time interval during which a wireless access device can send as many frames or packets as possible, so long as the duration of the transmissions does not extend beyond the maximum duration of the TXOP. The maximum size of TXOP bursting may be controlled, for example, by a QoS parameter set allocated in a beacon frame in EDCA mode.

In operation, one or more encoded media packets 310/320 are transmitted within each transmission window 302/304 of the transmission frame interval 300. In an exemplary embodiment involving intra-frame and inter-frame video coding techniques, such media packet(s) 310/320 may include all or much of the information necessary to decode a given video frame (or, for example, a video subframe, video slice, et cetera) within a video stream. Further, media packet(s) 310/320 might comprise either a set of packets or a single packet, which may be a relatively large packet that is segmented into smaller packets for transmission. The media packet(s) 310/320 may represent various forms of content or combinations thereof, including video, transcoded video, audio, animation, text, still images, interactivity content, et cetera.

As described more fully below in conjunction with FIGS. 4A-4D, the media packet(s) 310/320 may be marked with expiration time-stamps before being queued for transmission. The initial expiration time-stamps correspond to the end ($E_{t1}$ or $E_{t2}$) of an allocated transmission window, and the expiry time of individual media packets may be dynamically adjusted in accordance with the invention for purposes of reallocating unused portions of transmission windows.

Each of the disclosed transmission windows 302/304 may further include at least one interleaved transmission acknowledgment fields ACK or NACK 306, which may be used by the transmitting device in determining transmission status information for individual media packets 310/320. In an alternate embodiment, BACK/BNACK 312/322 may be utilized to determine transmission status information for one or more aggregated media packets. Other acknowledgement information or mechanisms may be employed to indicate transmission status and facilitate adaptive channel allocation in accordance with the invention.

FIGS. 4A-4D illustrate example allocations of the transmission frame interval 300 under various wireless channel conditions and/or operating conditions in accordance with the present invention. In the illustrated embodiments, default transmission windows for packets to be provided to a first client device (CD1) and packets to be provided to a second client device (CD2) are of approximately equal duration, but may alternatively be disproportionate as a result, for example, of an earlier reallocation process or prioritization based on channel/device characteristics and/or data load (which may be constant or variable between transmission windows in a media stream). If, for instance, a first client device has poor reception characteristics, transmission windows could be established such that CD1 is initially allocated more (or less) than a pro rata share of the transmission frame interval(s) 300. Further, default boundaries between transmission windows in the transmission frame interval (and/or packet expiry times) may be adaptively altered in accordance with the invention.

The video encoder or other host device functionality may be operable to generate an indication (e.g., by setting bits) of the first and last media packets for a given video device during a transmission frame interval 300. Prior to being forwarded to a transmission queue of the transmitting device, these packets may be marked with an expiration time-stamp corresponding to the end of the associated transmission window. Packet marking/time-stamping could be performed, for example, by hardware or software functionality of the transceiver 234, such as packetizer/framing logic 236.

For packets that are not successfully transmitted prior to such expiration time, a "transmit status" message may be communicated to a host/application layer by the transceiver 234 indicating that the packets have expired. Rather than being dropped or released by the software stack of the media server/gaming console 202, the expired packets may be buffered by the application layer for potential re-submission to the transmission queue (with a new expiration time) in the event that unused portions of the transmission frame interval 300 or a subsequent transmission frame interval 300 are identified.

In one embodiment, the following statistics for media packets CD1/CD2 are maintained by the wireless driver 240 for use in approximating unused capacity in the transmission frame interval 300 and calculating new expiration times:

$T_F$—the time at which the transmitting device receives transmission completion information for the first media packet intended for a client device during a transmission frame interval, and $T_L$—the time at which the transmitting device receives transmission completion information for the last media packet intended for a client device during the transmission frame interval.

When the transceiver 234 receives the first media packet of CD1/CD2 from the encoder(s) 232, it calculates an expiration time ($E_c$) for all associated packets as follows:

$E_c = E_{c-1} + A_c$, where $A_c$ is the duration of the allocated transmission window (e.g., 8.3 ms),
c=0 to N−1,
$E_{c-1} = T_L$, and
N=total number of active client devices.

Referring now to FIG. 4A, media packets CD1 430 and CD2 432 are successfully transmitted within first and second transmission windows, respectively. As shown, successful transmission of CD1 430 may result in an unused portion of the first transmission window. Following this first unused portion, transmission of CD2 432 commences at the beginning of a second transmission window allocated to CD2. Successful transmission of CD2 results in an unused portion of the second transmission window.

In the example transmission frame interval 300 of FIG. 4B, unused portions of a first transmission window (such as the first unused portion shown in FIG. 4A) are "reallocated" in accordance with the invention such that CD2 436 commences transmission during a reallocated portion of the first transmission window and prior to the initial start time of the second transmission window, continuing as necessary into the second transmission window. An exemplary method for the channel allocation of FIG. 4B is described below in conjunction with FIG. 5.

Referring to the example transmission frame interval 300 allocation of FIG. 4C, a partial portion of CD1 438 is successfully transmitted during a first transmission window. CD2 440 is next successfully transmitted prior to the end of a second transmission window. The unused portion of the second transmission window is used to transmit (during CD1 retry 442) buffered packets of CD1 that were not received correctly and have not reached an associated expiration time or have not exhausted a maximum number of retransmission attempts. For example, if expired packets of CD1 can be transmitted during the unused portion of the second transmission window, such (buffered) packets may be submitted for transmission with a newly calculated expiration time corresponding to the end of the second transmission window. If packets of CD1 retry 442 (or other packets) expire before they can be transmitted during the transmission frame interval 300, such packets may be dropped. In the example of FIG. 4C, the amount of time available in the second transmission window for transmission of CD1 retry 442 may be approximated as follows:

Unused time=duration of transmission frame interval−$T_{L2} + T_{F1}$, where $T_{F1}$ is set to zero (0) in the illustrated embodiment for sake of calculation simplicity.

An exemplary method for channel allocation in accordance with FIG. 4C is described below in conjunction with FIG. 6.

Referring to the example transmission frame interval 300 allocation of FIG. 4D, the default order of transmission of CD1 446 and CD2 444 is reversed in accordance with the invention. Such reversal may be a result, for example, of transmission tracking or other analytical step indicating that transmission of CD2 444 would likely be completed prior to the end of an initial/default transmission window (e.g., as illustrated by CD2 440). In the illustrated embodiment, CD2 444 is successfully completed during a first assigned transmission window, and any unused portions of this transmission window are used for transmission of CD1 446.

As will be appreciated, adaptive channel allocation according to the invention may also enable improved power consumption in the client devices 1 and 2. Following reception of the final packet for a recipient client device in a transmission frame interval (e.g., CD2 444), for example, a recipient client device could be instructed to enter a low power state until the next transmission frame interval.

Figure 5:
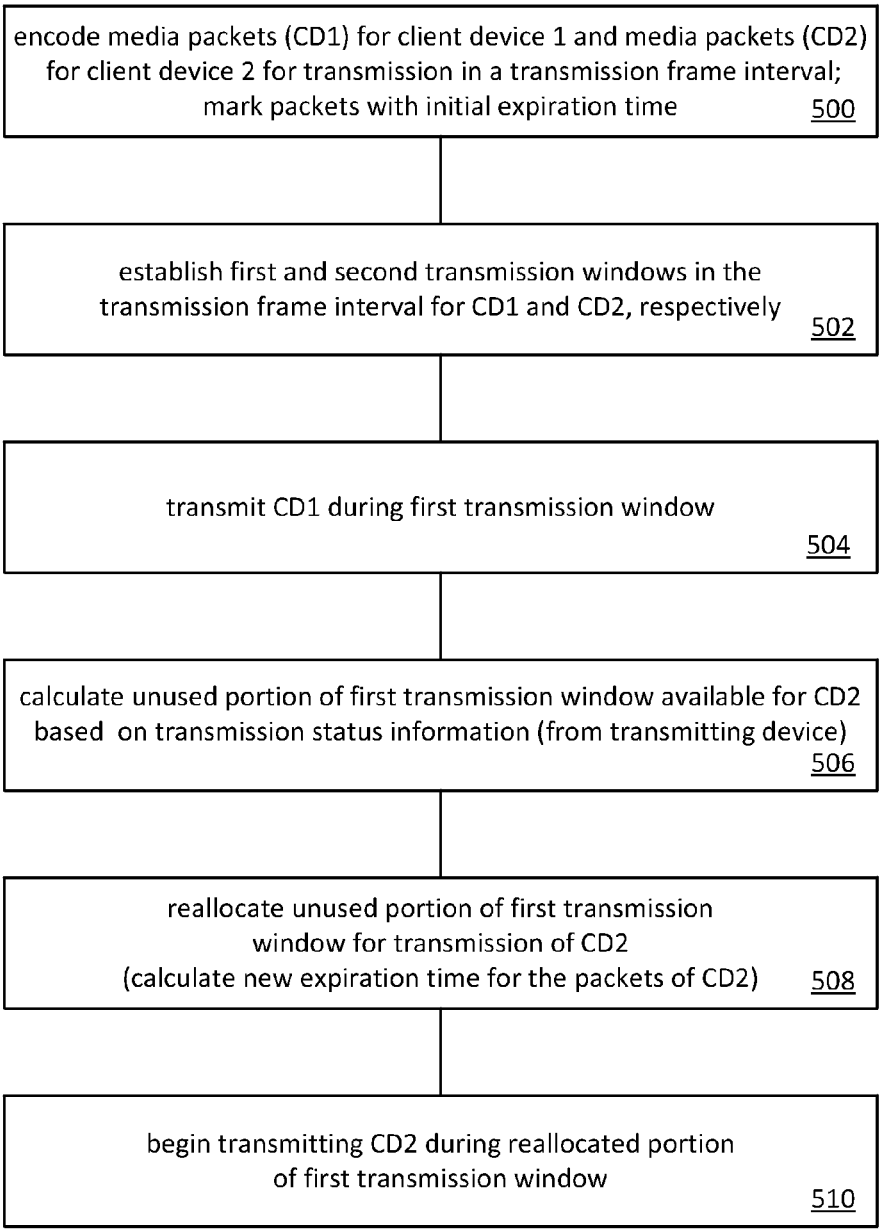
FIG. 5 is a flow chart that illustrates channel allocation by a wireless access device according to an embodiment of the invention.

FIG. 5 is a flow chart that illustrates channel allocation by a wireless access device according to an embodiment of the invention. The illustrated method generally attempts to reallocate an unused portion(s) of a transmission frame interval for retransmission of failed packet transmissions, as well as transmission of packets which were not able (or unlikely) to be transmitted during a default transmission window.

Referring to step 500, media packets CD1 and CD2 are encoded for delivery to respective client devices 1 and 2. The media packets CD1 in the illustrated embodiment may include, for example, all or much of the information necessary to decode a video frame in a video stream destined for client device 1, and the media packets CD2 may similarly include information necessary to decode a video frame in a video stream destined for client device 2. In one embodiment, the encoder(s) 232 generates all or substantially all of the media packets CD1 prior to generating media packets CD2, and in another embodiment CD1 and CD2 may be substantially the same. The media packets CD1 and CD2 are further marked or otherwise associated with initial expiration times corresponding to default transmission window 302/304 allocations. In step 502 (which may occur before or after step 500) a first transmission window within the transmission frame interval is established for media packets CD1 and a second transmission window within the transmission frame interval is established for media packets CD2.

Next, in step 504, an attempt is made to transmit media packets CD1 during the first transmission window. Under favorable channel/load conditions, the transmission of CD1 may not require the full duration of the first transmission window (as in the illustrated embodiment). The resulting unused portion of the first transmission window is calculated in step 506 based on transmission completion information (or other timely indications of transmission status) from the transmitting device. In particular, tracking of transmission initiation and completion times (on a per client basis) may be employed for packets having an expiration time within a given transmission frame interval.

Channel reallocation according to the invention is next performed in step 508, and unused portions of the first transmission window are reallocated for transmission of CD2. Reallocation in accordance with the invention may involve calculating or modifying the expiration time of the media packet(s) of CD2. In step 510, transmission of CD2 is initiated during the reallocated portion of the first transmission window, continuing as necessary into the second transmission window.

Figure 6:
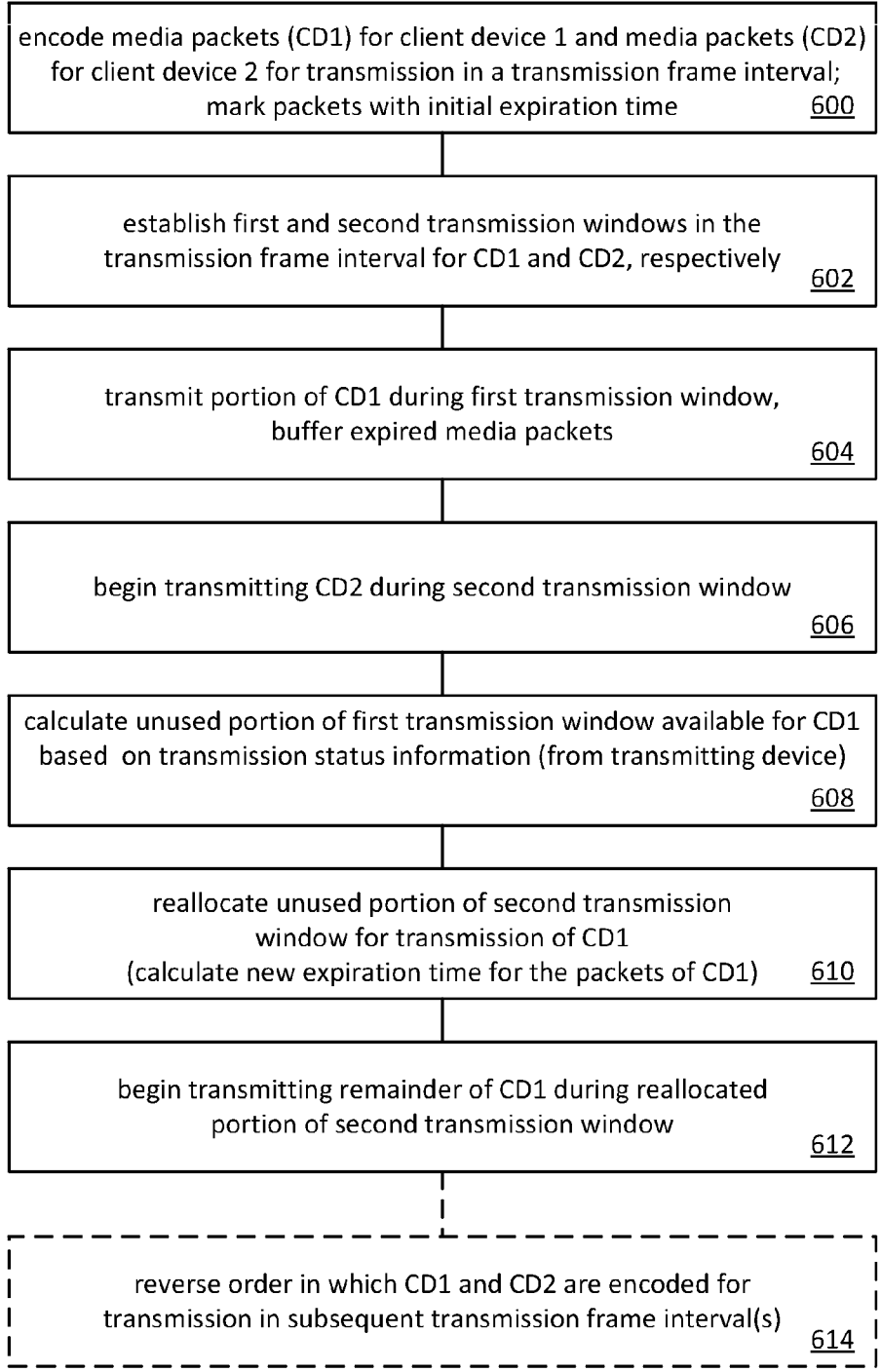
FIG. 6 is a flow chart that illustrates channel allocation according to an alternate embodiment of the invention.

FIG. 6 is a flow chart that illustrates channel allocation according to an alternate embodiment of the invention. The illustrated method generally attempts to reallocate an unused portion(s) of a second transmission window within a transmission frame interval for retransmission of failed packet deliveries in a preceding first transmission window.

Referring to step 600, media packets CD1 and CD2 are encoded for delivery to respective client devices 1 and 2. Individually, the media packets CD1 and CD2 in the illustrated embodiment may include, for example, all or much of the information necessary to decode a video frame in a video stream. In step 602 (which may occur before or after step 600) a first transmission window within the transmission frame interval is established for media packets CD1 and a second transmission window within the transmission frame interval is established for media packets CD2.

Next, in step 604, an attempt is made to transmit media packets CD1 during the first transmission window. Under poor channel/load conditions, the transmission of CD1 may not be completed within the first transmission window (as in the illustrated embodiment). Rather than being dropped or released by the software stack of the media server/gaming console 202, the "expired" packets of CD1 may be buffered, for example, by an application layer for potential re-submission to the transmission queue (with a new expiration time) in unused portions of the transmission frame interval 300 or a subsequent transmission frame interval.

Following the end of the first transmission window, an attempt is made (step 606) to transmit media packets CD2 during the second transmission window. The unused portion of the second transmission window is calculated in step 608 based on transmission completion information (or other timely indications of transmission status) from the transmitting device. In particular, tracking of transmission initiation and completion times (on a per client basis) for packets having an expiration time within a given transmission frame interval may be employed.

Channel reallocation according to the invention is next performed in step 610, and any unused portions of the second transmission window are reallocated for transmission of CD1. In step 612, transmission is initiated for the remaining media packets CD1 during the reallocated portion of the second transmission window, continuing as necessary until the end of the second transmission window. As alluded to above with reference to FIG. 4D and elsewhere herein, in optional step 614 the order in which CD1 and CD2 are encoded for transmission in subsequent transmission frame interval(s) may be reversed in order to reduce the number of future reallocations.

Figure 7A:
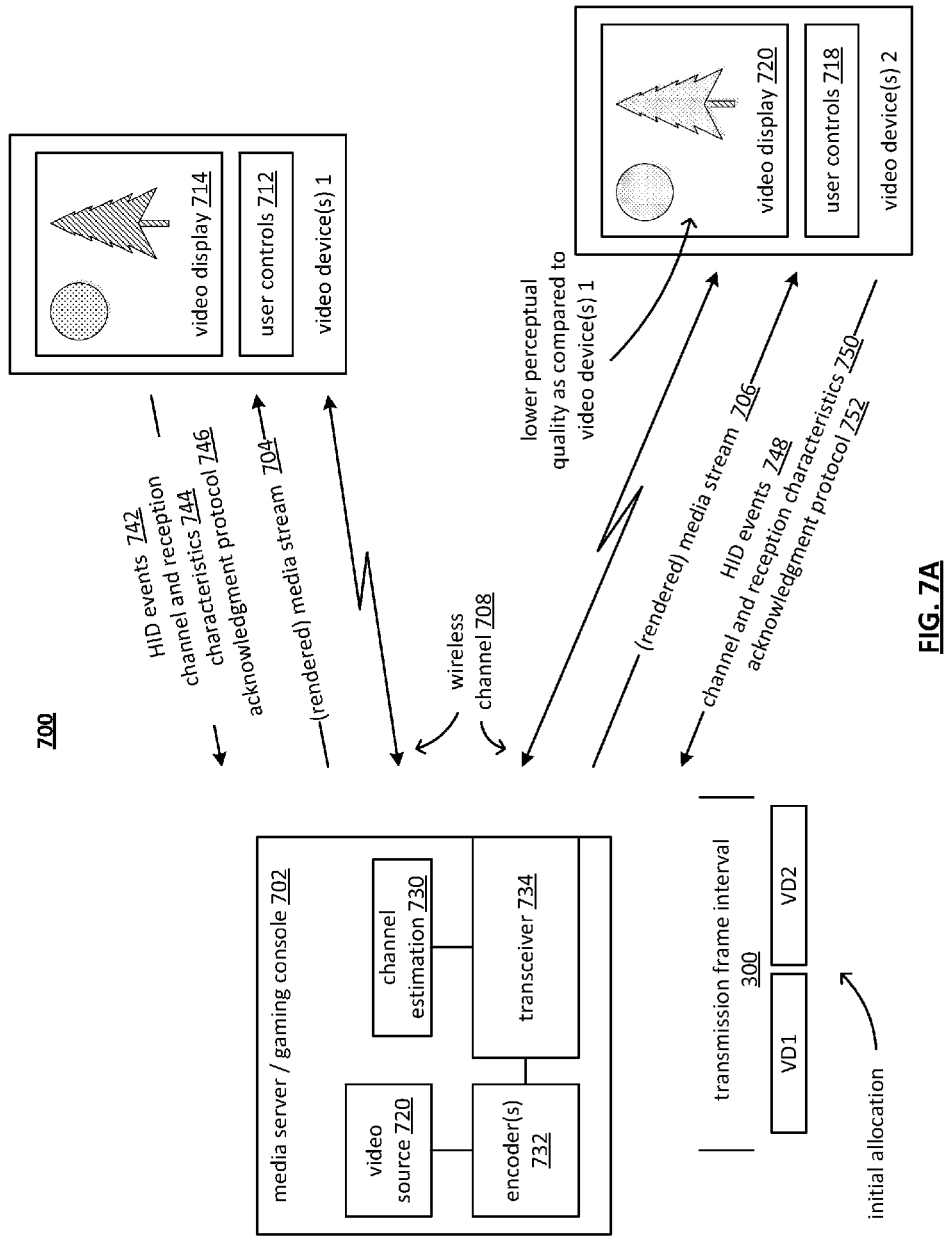
FIGS. 7A and 7B are functional block diagrams illustrating adaptive wireless channel allocation in a multi-user environment in accordance with a further embodiment of the invention.
Figure 7B:
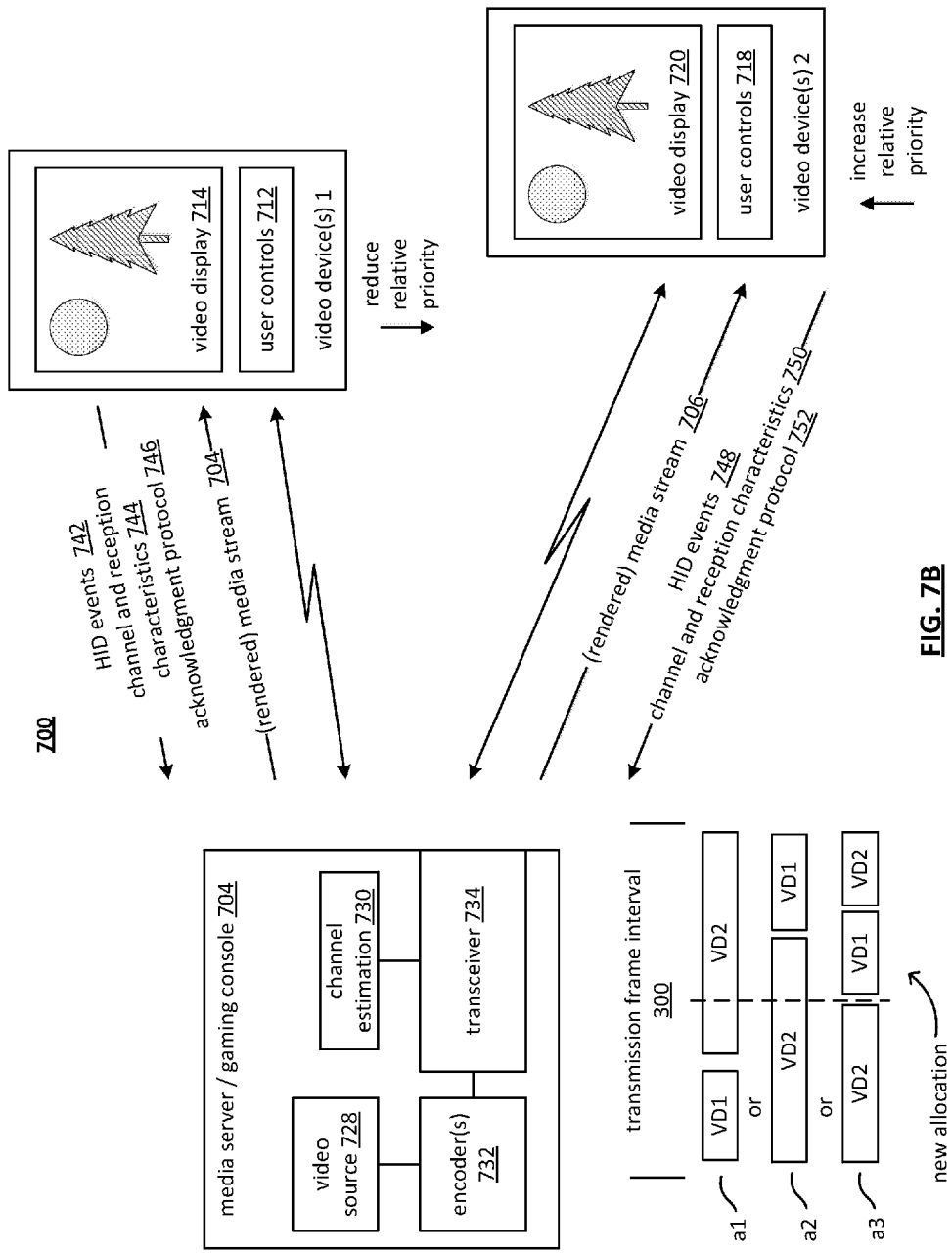

FIGS. 7A and 7B are functional block diagrams illustrating adaptive wireless channel allocation in a multi-user environment in accordance with a further embodiment of the invention. In the illustrated embodiment, a media server/gaming console 702 provides one or more (rendered) media streams 704 and 706 to a video device(s) 1 and a video device(s) 2, respectively, over a wireless channel 708, which may comprise, for example, a remote gaming interface/controller with video display capabilities. Certain illustrated blocks, such as video source 720, encoder(s) 732, and transceiver 734 function generally as described above.

The illustrated embodiment includes channel estimation 730 capabilities (which may implement a wide variety of channel estimation techniques, such as those incorporated by reference herein) to generate data for use in prioritizing communications to one or more video devices. Channel estimation 730 may utilize, for example, channel and reception characteristics 744/750 and acknowledgment protocol signaling 746/752.

Channel and reception characteristics 744/750 may include, for example, a raw bit error rate, packet error rate, power mode information, signal to noise and interference ratio, Received Signal Strength Indication (RSSI), packet retransmission rate, multipath interference indications, gain estimates from, for example, a multi-variable common filter, and various reception parameters or other metrics that can be used to assess or rate the quality of received transmissions and/or the ability of the wireless channel 708 to effectively send the media streams 704 and 706 to a video device(s) 1 and a video device(s) 2. Additional PHY characteristics and protocol parameters may be utilized in the channel estimation 730 process, including operational frequency/band, the selected modulation and coding scheme (MCS), the size of the MAC protocol data units (MPDUs) and the use of packet aggregation, supported PHY rates of the transmission protocol, channel bandwidth (e.g., 20/40 MHz), guard intervals (GIs), the relevant transmission acknowledgment policy (e.g., Normal ACK/NACK, B-ACK (Block Acknowledgment) or aggregated acknowledgment, No-ACK), average size of the data (e.g., MPDUs) in an encoded stream, channel load, the number of transmit streams, et cetera. Channel estimation 730 in accordance with various embodiments of the present invention may utilize one or more indicia of the above channel characteristics.

Referring more specifically to FIG. 7A, an exemplary initial allocation is shown for transmission frame intervals 300 used in the transmission of media streams 704 and 706. In this embodiment, media packets VD1 for video device 1 and media packets VD2 for video device 2 are initially allocated approximately equal portions of the transmission frame interval 300. As illustrated, this default allocation may, for example, result in a comparatively lower perceptual quality in the video displayed by video device 2. For example, the default allocation and channel conditions might require a lower encoding bit rate for media packets VD2 in order to avoid expired packets, buffer overflow, et cetera.

FIG. 7B illustrates various exemplary channel allocations that may be utilized to reduced disparities in perceptual quality, and more particularly a situation wherein it is desirable to improve the quality (increase the relative priority) of a media stream delivered to video device 2. In this embodiment, the portion of the transmission frame interval 300 allocated for media packets VD2 is increased at the expense of media packets VD1 in order to facilitate improvements to the relative perceptual quality of video delivered to video device 2. Under new allocation a1, a portion of a first transmission window for VD1 is reallocated to VD2. Under alternate allocation a2, the ordering of the transmission windows is reversed, with a greater allocation for VD2. Under alternate allocation a3, the transmission frame interval 300 is partitioned into a first transmission window for VD2, followed by a second transmission window for VD1. A third transmission window, for VD2, is also provided. The third transmission window may be a reserved portion of the transmission frame interval 300, or an unused portion of the second transmission window.

HID events 742 or similar signaling may also be used in adaptive channel allocation in accordance with certain embodiments of the invention. For example, user controls 712/718 could permit a user to manually indicate an unsatisfactory perceptual quality for displayed media, and request a reallocation of channel capacity.

Figure 8:
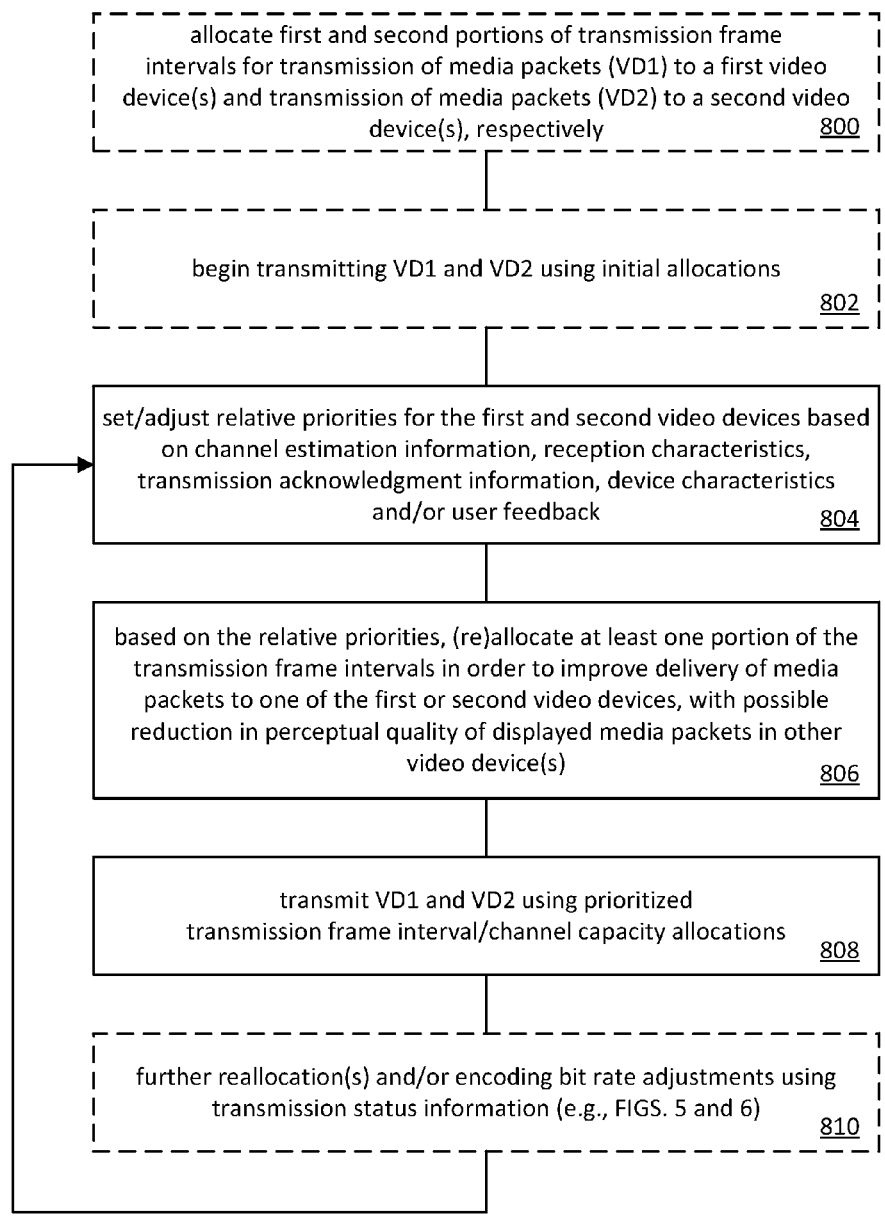
FIG. 8 is an operational flow diagram illustrating a method for adaptively allocating channel capacity based on relative priorities of receiving devices in accordance with an embodiment of the present invention.

FIG. 8 is an operational flow diagram illustrating a method for adaptively allocating channel capacity based on relative priorities of receiving devices in accordance with an embodiment of the present invention. Referring to step 800, first and second portions of transmission frame intervals are allocated, respectively, for transmission of media packets (VD1) to a first video device(s) and transmission of media packets (VD2) to a second video device(s). In the illustrated embodiment, media packets VD1 and VD2 allocated for transmission in a given transmission frame interval may include, for example, all or much of the information necessary to decode video frames in video streams destined for first and second devices, respectively. In step 802, transmission of VD1 and VD2 is initiated using the transmission frame interval allocations of step 800.

Next, in step 804, relative priorities are set/adjusted for the first and second video devices based, at least in part, on one or more of the following: channel estimation information, reception characteristics, transmission acknowledgment information, video device and video source characteristics and/or user feedback. The relative priorities are utilized in step 806 to (re)allocate at least one portion of the transmission frame intervals in order to improve delivery of media packets to one of the first or second video devices (which may comprise a logical grouping of such devices). The method continues in step 808 where transmission of VD1 and VD2 is attempted using prioritized transmission frame (or other channel capacity) allocations. As previously discussed, reallocation in accordance with the invention may result in a reduction in the perceptual quality of decoded media packets in a video device that has a reduced allocation of the transmission frame interval as a result of a prioritization/reallocation process.

As shown in optional step 810, the transmissions of step 808 may be subjected to further reallocation (e.g., reallocation of transmission windows of a transmission frame interval in accordance with methods described above in conjunction with FIGS. 4-6). Adaptive channel allocation in accordance with the invention may comprise various other techniques for improving/allocating bandwidth utilization. For example, the encoder(s) 732 may be instructed to encode the media stream 704 for CD1 with a lower/higher bit rate (quality), video frame rate, or video frame size, thereby accommodating a reduced or increased allocation of the transmission frame interval. In yet another embodiment, the quality of an audio portion of a media stream might be reduced in order to increase the channel allocation for a video portion of the media stream (or vice versa).

In a further mode of operation, and in conjunction with or in lieu of channel reallocation, the media server/gaming console 702 may selectively adjust one or more protocol parameters, such as the packet length, data rate, forward error correction, error detection, coding scheme, modulation spectral densities, contention period, and back-off parameters used in communications with one or more video devices. In this fashion, the protocol parameters can be adapted based on the conditions or estimated conditions of the network, including not only the association characteristics of a particular device, but the reception characteristics of a plurality of devices, to reach acceptable/prioritized media delivery qualities.

Although the above description relates in particular to a system involving a host device communicating media content in a single-hop environment with a plurality of video devices, it should be clear that the teaching of the present invention might be applied to other types of data content and systems, including multi-hop environments.

It is noted that the various modules and/or circuitries (e.g., encoding modules and/or circuitries, decoding modules and/or circuitries, encoder rate adaptation modules and/or circuitries, et cetera) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, et cetera within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, et cetera without departing from the scope and spirit of the invention.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

What is claimed is:

1. A method for transmitting media streams from a media server to a first client device and a second client device over a wireless channel during respective allocated portions of shared transmission frame intervals, comprising:
    transmitting media packets to the first client device during a first allocated portion of a first transmission frame interval(s);
    transmitting media packets to the second client device during a second allocated portion of the first transmission frame interval(s);
    establishing relative priorities for the first and second client devices based on at least one of associated wireless channel estimation information, reception characteristics, transmission acknowledgment information, client device characteristics or user feedback; and
    reallocating, based on relative priorities, at least one portion of the first or second allocated portions of the transmission frame interval(s) to the other of the first or second allocated portions for further transmission of media packets by the media server during a subsequent transmission frame interval.

2. The method of claim 1, further comprising:
    adaptively adjusting the relative priorities of the first and second client devices in response to a variation(s) in at least one of the associated wireless channel estimation information, reception characteristics, transmission acknowledgment information, client device characteristics or user feedback.

3. The method of claim 1, wherein reallocating at least one portion of the first or second allocated portions of the transmission frame interval(s) results in reduced perceptual quality of media packets as displayed by the first or second client device.

4. The method of claim 1, further comprising:
    establishing a reserved portion of the shared transmission frame intervals; and
    allocating the reserved portion for transmission of media packets to the first or second client device based on the relative priorities of the first and second client devices.

5. The method of claim 1, further comprising:
    decreasing the encoding bit rate of media packets transmitted during the portion of the transmission frame interval(s) receiving a reduced allocation as a result of the step of reallocating.

6. The method of claim 1, wherein the first and second encoded media packets represent video data having a constant or near constant encoding bit rate.

7. The method of claim 1, wherein the client devices comprise remote gaming interfaces.

8. An apparatus, comprising:
    a transceiver operable to support wireless media packet transmissions to at least a first client device and a second client device during a succession of transmission frame intervals, the transmission frame intervals comprising first and second portions allocated between the first and second client devices;
    an encoder(s) operable to encode media packets for transmission by the transceiver to the first and second client devices; and
    a processor coupled to the transceiver, the processor operable to adaptively allocate the first and second portions of the transmission frame intervals, the adaptive allocation comprising:
        establishing relative priorities for the first and second client devices based on at least one of associated wireless channel estimation information, reception characteristics, transmission acknowledgment information, client device characteristics or user feedback; and
        reallocating, based on the relative priorities, at least one portion of the transmission frame interval(s) to the first or second allocated portions for further transmission of media packets.

9. The apparatus of claim 8, wherein reallocating at least one portion of the transmission frame interval(s) results in reduced perceptual quality of media packets as displayed by the first or second client device.

10. The apparatus of claim 8, the adaptive allocation further comprising:

adaptively adjusting the relative priorities of the first and second client devices in response to a variation(s) in at least one of the associated wireless channel estimation information, reception characteristics, transmission acknowledgment information, client device characteristics or user feedback.

11. The apparatus of claim 8, the adaptive allocation further comprising:
    establishing a reserved portion of the transmission frame intervals; and
    allocating the reserved portion for transmission of media packets to the first or second client device based on the relative priorities of the first and second client devices.

12. The apparatus of claim 8, the processor further causing the encoder to adaptively alter the encoding bit rate of a portion of the media packets based, at least in part, on relative priorities for the first and second client devices.

13. The apparatus of claim 8, the apparatus comprising a gaming console.

14. The apparatus of claim 13, wherein the client devices comprise remote gaming interfaces.

15. An apparatus, comprising:
    a transceiver operable to support wireless video transmissions to a plurality of devices during respective portions of transmission frame intervals allocated to individual ones of the plurality of devices; and
    a processor coupled to the transceiver, the processor operable to adaptively allocate available portions of the transmission frame intervals among the plurality of devices in accordance with prioritization of the plurality of devices, the prioritization of the plurality of devices based on at least one of a plurality of metrics associated with communications between the apparatus and the plurality of devices.

16. The apparatus of claim 15, the plurality of metrics comprising wireless channel estimation information, reception characteristics, client device characteristics or user feedback.

17. The apparatus of claim 15, the apparatus comprising a gaming console.

18. The apparatus of claim 15, the plurality of devices comprising remote gaming interface devices, wherein:
    each of the plurality of remote gaming interface devices having a common default priority; and
    the processor initially allocating the available portions of the transmission frame intervals equally among the plurality of remote gaming interface devices.

19. The apparatus of claim 15, the plurality of devices comprising a first remote gaming interface device(s) having a first priority and a second remote gaming interface device(s) having a second priority being relatively lower than the first priority; and
    the processor allocating all of the available portions of the transmission frame intervals to the first remote gaming interfaces device(s).

* * * * *